UNITED STATES PATENT OFFICE.

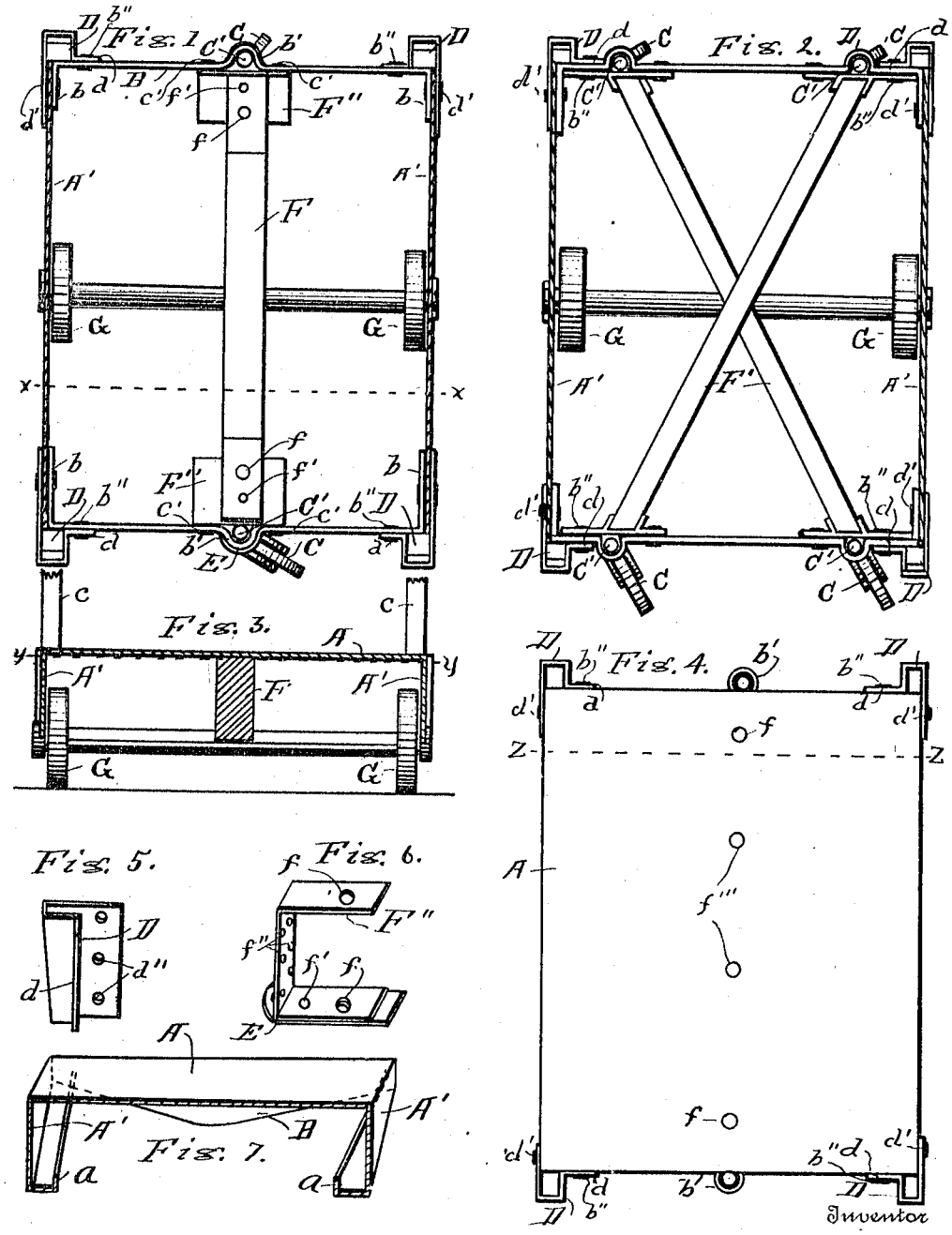

WILLIAM VANMANEN, OF GRAND RAPIDS, MICHIGAN.

WAREHOUSE-TRUCK.

988,677.　　　Specification of Letters Patent.　　Patented Apr. 4, 1911.

Application filed November 26, 1909. Serial No. 530,056.

*To all whom it may concern:*

Be it known that I, WILLIAM VANMANEN, a citizen of the United States, residing at Grand Rapids, in the county of Kent and State of Michigan, have invented certain new and useful Improvements in Warehouse-Trucks, of which the following is a specification.

My invention relates to improvements in trucks for use for conveying lumber, &c., from place to place in factories, stores, &c., and its objects are: First, to provide a means whereby a truck may be easily made of sheet metal, and so firmly braced as to avert the danger of warping, without too great an expense involved. Second, to provide a means for readily attaching the casters and stakes to a metal truck, and, third, to so construct the lower edges of the sides and ends as to avert the danger of their bending and buckling when the truck is heavily loaded. I attain these objects by the mechanism illustrated in the accompanying drawing, in which—

Figure 1 is a sectional plan of a truck on the line *y y* of Fig. 2 showing the manner of attaching a single beam to act as a brace to avert the danger of warping the truck. Fig. 2 is the same showing double or cross beams for the purpose of strengthening the truck. Fig. 3 is a vertical section of a truck, practically on the line *x x* of Fig. 1. Fig. 4 is a plan of a truck with the casters removed. Fig. 5 is a perspective of a stake socket removed from the truck. Fig. 6 is a perspective of the strap that infolds the end of the beam, and of the plate beneath it for supporting the stem of the caster, and, Fig. 7 is a perspective of one end of a truck, cut off, practically, upon the line *z z* of Fig. 4 showing the construction of the sides of the truck to give it the greatest possible strength with the least possible weight.

Similar letters refer to similar parts throughout the several views.

In the construction of these trucks the top and sides are made from a single piece of thin sheet metal, as indicated in Figs. 3 and 7, where A represents the top and A′ A′ represent the sides, which are made to project or depend downwardly several inches below the top. The wheels G G are attached to these trucks in practically the same manner that wheels are attached to wooden trucks of this general construction. The end rails B B are made of much heavier material than that used in the top and sides, and are bent backward at right angles at each end to form wings *b* by means of which they may be readily riveted, or otherwise secured to the sides, as indicated at *d′* in Figs. 1, 2, 3, and 4, and proper sockets, as *b′*, are formed in position in the body of these ends, to receive the shank or stem C′ of the casters C.

With these trucks it is necessary to provide for supporting stakes *c* at each end so that there will be no danger of the load falling off of the truck, and for this purpose I form sockets D D of sheet metal, so constructed that one wing will extend along the side of the truck. This wing is provided with small holes, as *d″*, by means of which the bolts or rivets *d′* may be passed through them to secure them to the side of the truck, so that the socket D will project beyond the ends of the truck. To one side of this socket a flange *d* is turned and so located that it may be secured to the ends of the truck by means of bolts or rivets, as indicated at *b″* in Figs. 1 and 2. With the truck left as now described it would be impossible to prevent it from warping badly out of shape, and becoming practically useless. To avert this danger I place a heavy wooden beam or brace, as F, or a pair of cross braces, as F′, in position to engage both ends of the truck. I prefer the use of a single beam, as shown in Fig. 1, as it is much less expensive, more readily applied and equally as reliable as the cross beams shown in Fig. 2. To secure this beam to the ends of the truck I form a strap, or straps, as F″, of such form that they cover the ends and the upper and lower sides of the beam for a short distance back from the ends, and form small holes *f″* through them in position so that they may be firmly bolted or riveted to the ends B B at each side of the sockets *b′*, as indicated at *c′* in Fig. 1. These straps are firmly secured to the beam by passing a bolt, or other suitable device through the holes *f*, straps F″ and the beam F, in Fig. 1, and through the top A of the truck, in Fig. 4. The top A may be further secured to the beam by passing bolts, heavy lag screws, or other devices through the holes *f‴*, shown in Fig. 3.

E represents a short plate that is riveted to the lower wing of the strap F″ and projects somewhat beyond the outer surface thereof to form a bearing for the shoulder at the caster end of the shanks C′, to rest upon or against. These act a double purpose, first, to act as a bearing to support the caster, C, as hereinbefore stated, and, second, to greatly strengthen the end rails by connecting them with the ends of the beam.

I find that it greatly strengthens the sides and ends of the truck to make them broad at the longitudinal center, and gradually taper them toward the ends, as indicated in Fig. 7. For the purpose of strengthening the lower edges of the sides, and to avert the danger of their buckling and sagging under excessive loads, I form a return flange, as indicated at $a$ $a$, on each side, as indicated in Fig. 7. I prefer that this strengthening device be made channel form, as shown, but any form of return bend will answer the purpose.

What I claim as new and desire to secure by Letters Patent of the United States, is:

1. A warehouse truck made of sheet metal and constructed with the top and sides in one piece, metal end rails having the ends bent at right angles and secured to the sides, and a caster socket formed in the longitudinal center thereof, metal stake sockets secured to the corners of the truck, and a beam extending the length of the truck and securely fastened to the end rails.

2. In warehouse truck construction, the top and sides made of a single piece of sheet metal, end rails formed of heavy sheet metal with the ends bent at right angles and securely attached to the sides, the body of the end rails bent to form sockets for supporting casters, a stake socket attached at each corner of the truck, a beam extending the length of the truck, straps secured to the ends of the beam and to the end rails of the trucks, and a plate secured to the lower surface of the ends of the beam and projecting out to form bearings for casters.

3. In warehouse truck construction, a single piece of sheet metal bent at right angles to form the sides and top of the truck and the lower edges bent in channel form to strengthen the sides, end rails formed of heavy sheet metal with the ends bent at right angles and securely fastened to the sides, the bodies of the end rails bent to form sockets to support casters, metal stake sockets secured to the corners of the truck, a wooden beam secured to the center of the truck and extending the length thereof, and secured to the end rails, straps secured to the beams and to the end rails of the trucks, and plates secured to the beams and extending to position to form bearings for casters.

4. In warehouse trucks, a metal top, sides integral with and bent down at right angles with the top with the lower edges channeled to provide rigidity, end rails secured to the top and sides, and a supporting beam extending the length of the truck and secured to the end rails, in combination with necessary caster supports and stake sockets secured to the sides and end rails.

Signed at Grand Rapids Michigan November 19, 1909.

WILLIAM VANMANEN.

In presence of—
I. J. CILLEY,
R. L. WILLIAMS.